July 27, 1965

W. PILZ ETAL 3,197,065

CLEARING ARRANGEMENT FOR DISPENSING
AND METERING APPARATUS

Filed April 19, 1963

INVENTORS
Werner Pilz
Dietmar Hummel
Gerhard Sleidle by Michael S. Striker
Atty

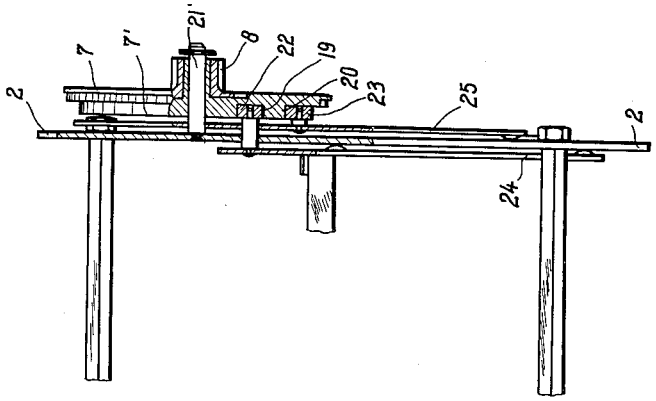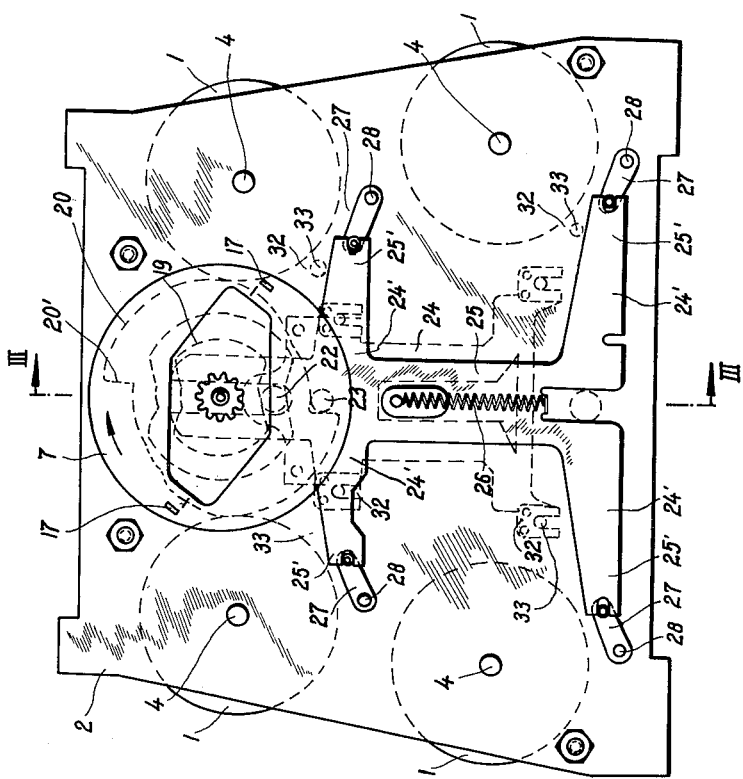

July 27, 1965

W. PILZ ETAL 3,197,065

CLEARING ARRANGEMENT FOR DISPENSING
AND METERING APPARATUS

Filed April 19, 1963

INVENTORS
Werner Pilz
Dietmar Hummel
Gerhard Staudte by Michael S. Striker
ATTY.

July 27, 1965   W. PILZ ETAL   3,197,065
CLEARING ARRANGEMENT FOR DISPENSING
AND METERING APPARATUS
Filed April 19, 1963   9 Sheets-Sheet 4
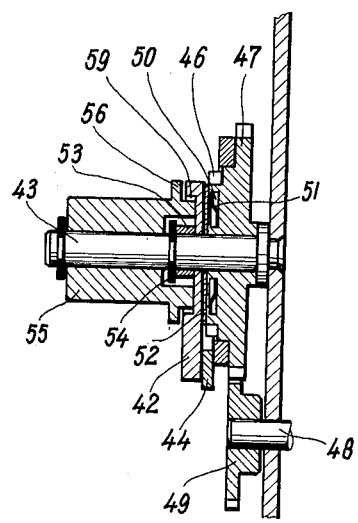
FIG. 8
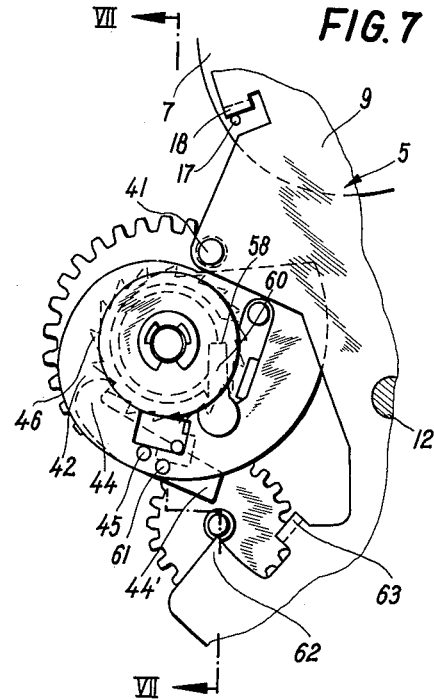
FIG. 7
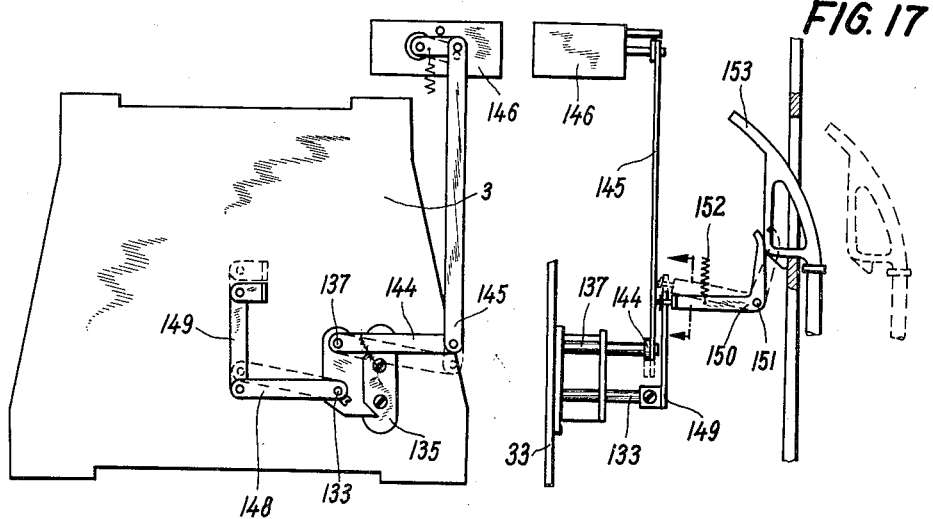
FIG. 16
FIG. 17
INVENTORS
Werner Pilz
Dietmar Hummel
Gerhard Steidle
by Michael J. Striker

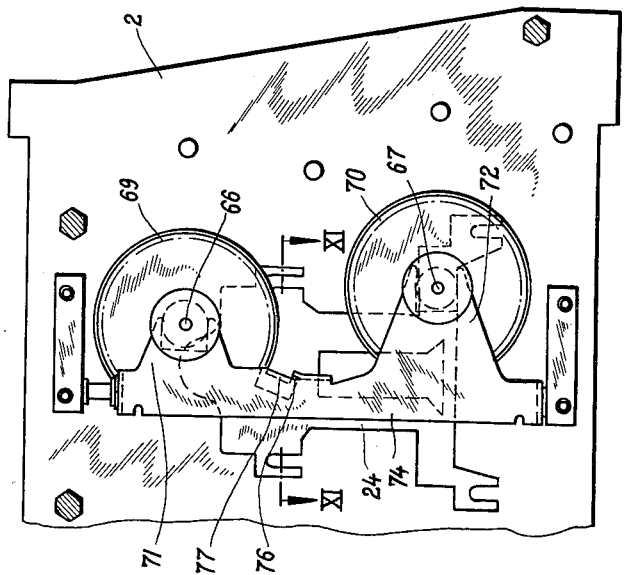
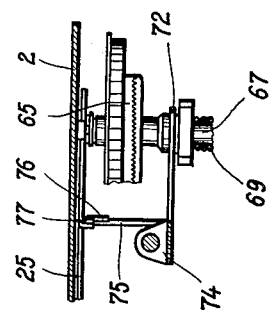
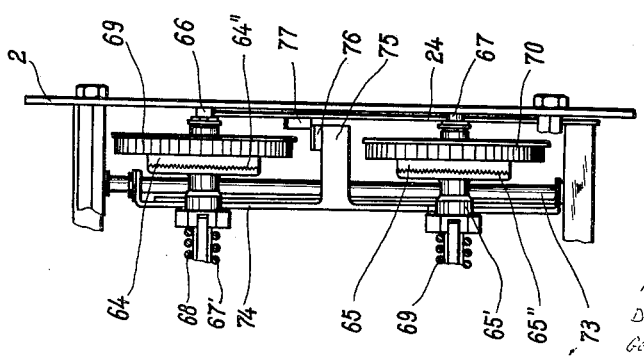

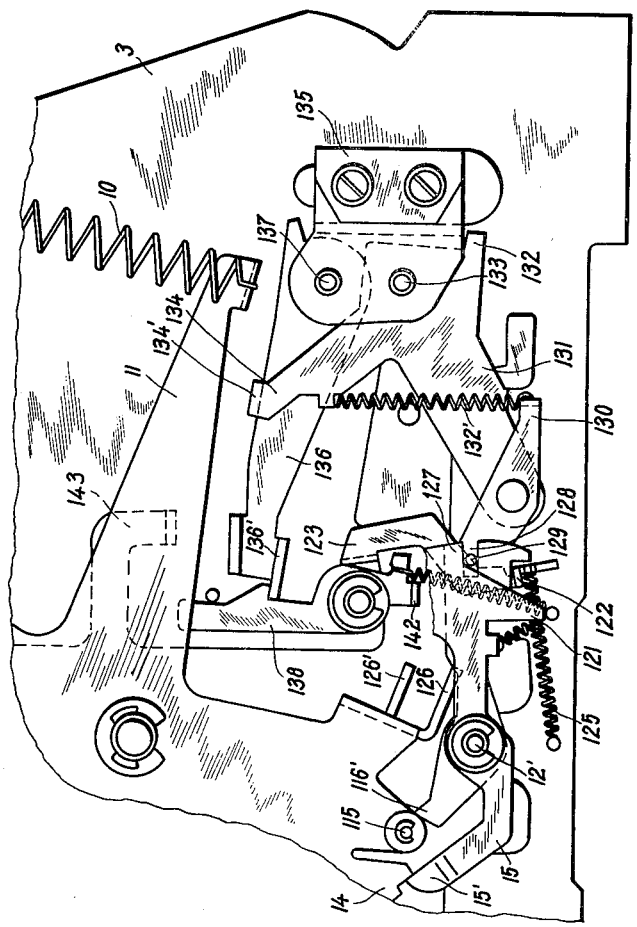

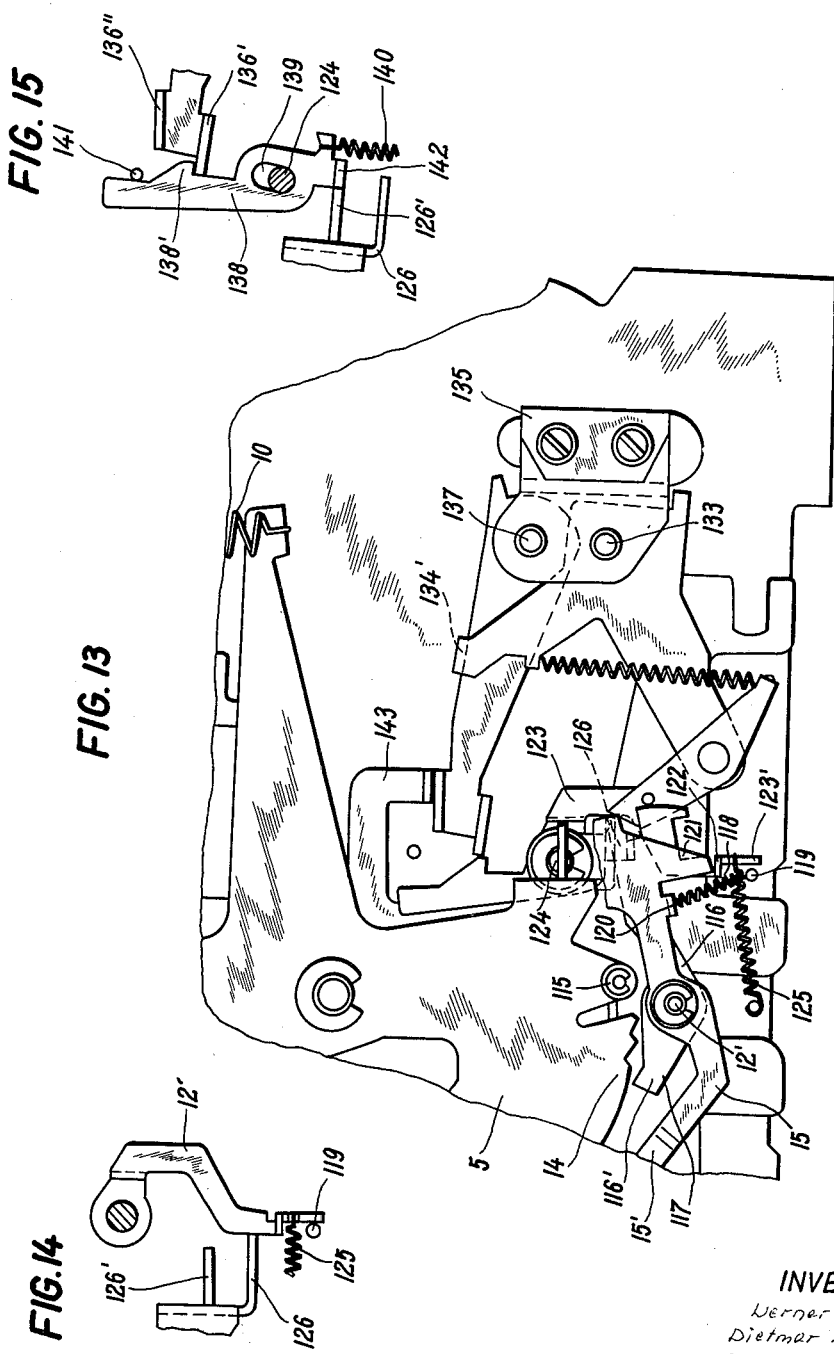

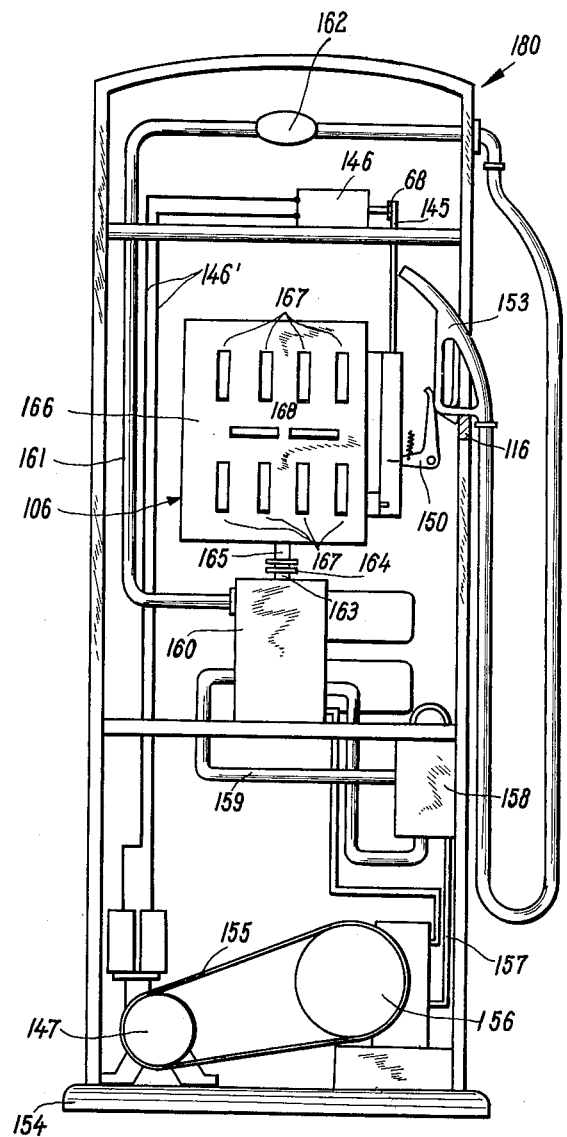

July 27, 1965
W. PILZ ETAL
CLEARING ARRANGEMENT FOR DISPENSING
AND METERING APPARATUS 3,197,065

Filed April 19, 1963

INVENTORS
Werner Pilz
Dietmar Hummel
Gerhard Steidle
by Michael S. Striker
Attorney United States Patent Office 3,197,065
Patented July 27, 1965

3,197,065
CLEARING ARRANGEMENT FOR DISPENSING
AND METERING APPARATUS
Werner Pilz, Dietmar Hummel, and Gerhard Steidle,
Schwenningen (Neckar), Germany, assignors to Kienzle
Apparate G.m.b.H., Villingen, Black Forest, Germany
Filed Apr. 19, 1963, Ser. No. 274,187
Claims priority, application Germany, Apr. 21, 1962,
K 46,543
20 Claims. (Cl. 222—33)

The present invention relates to a clearing arrangement for the number wheels of a register, and more particularly to a clearing arrangement for clearing the number wheels indicating the position of a meter which measures the amount of fluid dispensed at a gas station. It is necessary to return the indicating number wheels to a zero position after each dispensing operation, and the clearing arrangement of the present invention is a particularly advantageous construction serving this purpose.

Clearing arrangements are known in which a spring motor is wound up to provide the force for clearing the number wheels.

It is one object of the present invention to provide a clearing arrangement which is driven by a spring motor which can be, in accordance with prevailing conditions, wound up by the meter of the liquid, by any other source of power, or by a manual operation.

If the pump motor is accessible, it can be used for winding up the spring motor. Otherwise, the spring motor can be wound up by the meter when the same is driven by the dispensed liquid. It is necessary to have the possibility of winding up the spring motor by a manual operation, so that the pump column is not entirely useless when the devices for winding up the spring motor fail for some reason or other.

Means for manually winding up the spring motor are particularly important, if the meter of the dispensed liquid, or the shaft of the price calculator is used for winding up the spring motor. This is due to the fact, that occasionally such small quantities of liquid are dispensed that the spring motor cannot be fully wound up by the operation of the meter.

It is also an object of the present invention to provide a register having number wheels with a clearing arrangement which can be easily connected to existent apparatus, and can be operated fully automatically without disturbance of the operation of the gas station column.

Another object of the present invention is to provide a clearing arrangement for a register which can be operated with a minimum of power.

With these objects in view, the present invention relates to a clearing arrangement for the number wheels of the meter of a liquid dispensing station, such as a gas station. In accordance with the present invention, a heart cam device is used for clearing the number wheels, and tens-transfer devices between adjacent orders of number wheels are disconnected to permit the individual turning of the number wheels. Under control of the spring motor, control means are operated to simultaneously disconnect the tens-transfer means, and to operate the clearing members of the heart cam clearing device. The control means preferably include a pair of control slides operated by cams and cam followers.

In the preferred embodiment of the invention, coupling means are provided between the meter driven shaft, and the register, and such coupling means are automatically disconnected during the clearing operation.

A locking and release mechanism controls the movement of the drive member of the spring motor, and causes the actuation of the switch by which the pump motor is started and disconnected.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a side view of the clearing arrangement with certain parts omitted for the sake of clarity;

FIG. 3 is a fragmentary sectional view taken on line III—III in FIG. 2;

FIG. 7 is a fragmentary side view illustrating means for winding up a spring motor by which the clearing means are driven;

FIG. 8 is a fragmentary sectional view taken on line VIII—VIII in FIG. 7.

FIG. 9 is a fragmentary side view illustrating a coupling arrangement used in the apparatus of FIG. 1;

FIG. 10 is a fragmentary front view illustrating the coupling arrangement of FIG. 9;

FIG. 11 is a fragmentary plan view, partially in section taken on line XI—XI in FIG. 10;

FIG. 12 is a fragmentary side view illustrating a locking and release mechanism in accordance with the present invention;

FIG. 13 is a fragmentary side view illustrating the locking and release mechanism in another operational position;

FIG. 14 is a fragmentary front view illustrating a detail of the mechanism;

FIG. 15 is a fragmentary front view illustrating another detail of the mechanism.

FIG. 16 is a fragmentary side view, and FIG. 17 is a fragmentary front view illustrating a mechanical linkage between a liquid dispensing device and the locking and release mechanism of the invention;

FIG. 18 is a front view illustrating a gasoline dispensing column provided with a meter and indicating counter wheels which are cleared by the arrangement of the invention;

Figure 1:
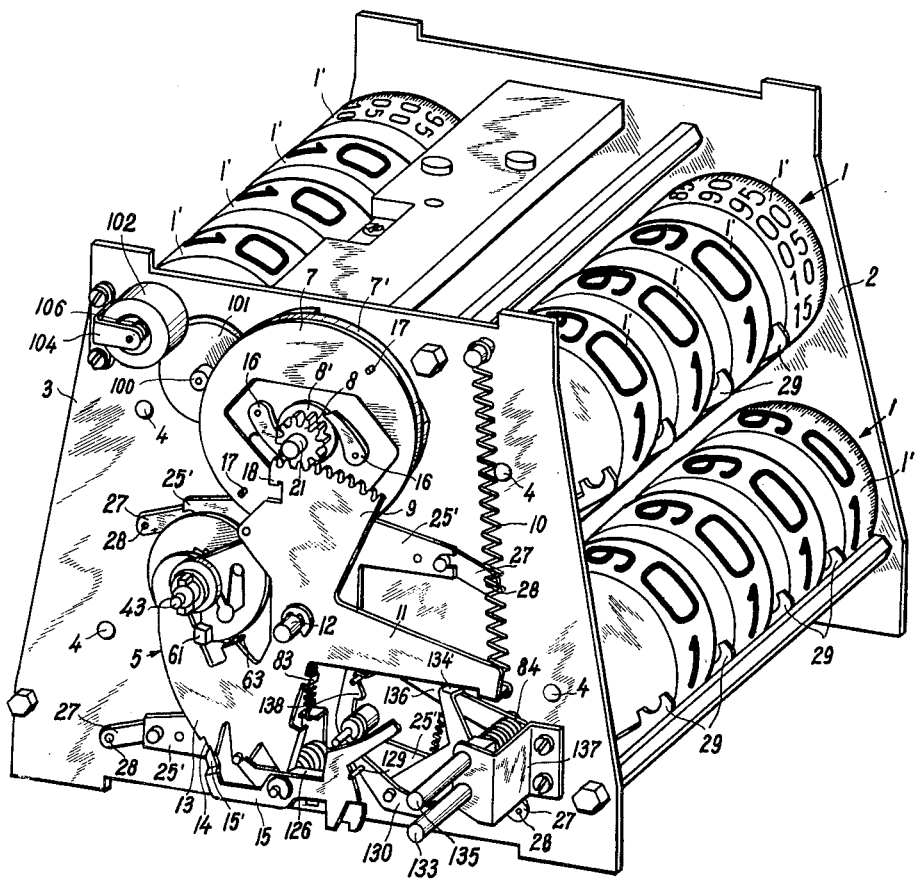
FIG. 1 is a perspective view illustrating a register clearing arrangement according to one embodiment of the invention.

Referring now to the drawings, and more particularly to FIG. 18 which illustrates a dispensing and indicating column of a gas station, a motor 147 is mounted on a frame 154 and is connected by a belt and pulley drive to a gasoline pump 156 which pumps the liquid through pipes 157 into an air and gas separator 158 and pipes 159 to a meter 160 which drives by its shaft 163 and a coupling 164 the drive shaft 165 of a register provided with number wheels whose indicia are visible through windows 167 and 168 in a cover plate 166.

The metered liquid passes through a pipe 161 and a transparent element 162 into a flexible hose and to the dispenser 153 which rests in the inoperative position shown in FIG. 18 on a wall portion 116 abutting an angular lever 150 to hold the same in the illustrated position. When the dispenser 153 is removed from its rest, and used for filling gasoline into the tank of a motor car, the spring 152 turns lever 150 in clockwise direction, as best seen in FIG. 17 so that a shaft 133 mounted on a bracket 135 is turned through link means 149, 148 to an adjusted position to control certain operations which will be described hereinafter in greater detail. Motor 147 is connected by conductors 146' to a switch 146 which is operated by a linkage 145, 144 connected to a shaft 137, as shown in FIGS. 16 and 17. Turning of shaft 137 will result in starting of motor 147, or in its disconnection from the source of voltage.

Referring now to FIG. 1, four register means 1 are mounted between a pair of supporting plates 2 and 3 by means of shafts 4. Support plate 3 carries the clearing arrangement of the present invention by which the number wheels 1' of the registers 1 are returned to zero position, while support plate 2 carries the price calculator, which is not illustrated in the drawing since it does not form part of the present invention.

A drive member 5 is mounted for turning movement on a shaft 12 and has an arm 11 connected to a spring 10 whose other end is secured to a pin on support plate 3. Drive member 5 and spring 10 constitute a spring motor by which the number wheels 1' are cleared. One segment-shaped arm of drive member 5 has locking teeth 14 cooperating with a locking lever 15 which is mounted for turning movement on a pivot 12'. Another segment-shaped arm of drive member 5 has gear teeth 9 meshing with a pinion 8 on a shaft 21. Pinion 8 is secured to a ratchet wheel 8' engaged by a pair of pawls 16 on a large gear 7 which is thus coupled to pinion 8 for rotation in one direction only. Gear 7 carries two stops 17 which abut at the end of each clearing operation on a stop projection 18 on drive member 5 whereby the turning movement of gear 7 is terminated.

Figure 1A:
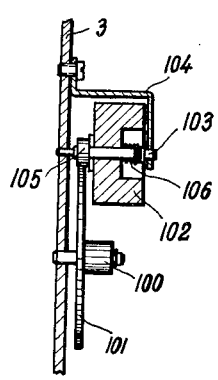
FIG. 1a is a sectional view illustrating a detail of FIG. 1 on an enlarged scale.

Gear 7 has teeth 7' around its periphery and meshes with a pinion 100 secured to a gear 101 driving another pinion on the shaft 103, as best seen in FIG. 1a. Shaft 103 is mounted on a bracket 104, and carries a rotary flywheel 102 which is urged by spring 106 against a disc located between pinion 105 and flywheel 102 so that a frictional connection between shaft 103 and the flywheel 102 is established. The rotary flywheel 102 will equalize the turning moments occurring at the gear 7, and the rotary parts connected thereto.

On the side of gear 7 facing support plate 3, control cam means are provided which include two cam tracks, as best seen in FIGS. 2 and 3. Cam track 19 guides a cam follower roller 22, and cam track 20 guides a cam follower roller 23 which are respectively mounted on control slides 24 and 25 which are respectively located on opposite sides of support plate 3. Cam track 19 is a groove with parallel lateral walls so that cam follower roller 22 is guided during movement in opposite radial directions, whereas cam follower roller 23 is urged by spring 26, secured to control slide 25, to engage the outer peripheral cam track 20.

Control slide 25 has four arms 25', each of which has a cutout engaging a pin on a lever 27. Four levers 27 are provided which are respectively fixed on four shafts 28, each of which carries a set of clearing members 29, as best seen in FIGS. 4a, 4b, 4c and FIG. 5. Each set of clearing members 29 cooperate with a set of number wheels 1', and is positioned intermediate two number wheels. Each number wheel 1' carries a heart cam 30 cooperating with a corresponding clearing member 29. When control slide 25 is shifted by cam follower 23, and cam track 20 upon turning movement of control means 7, all clearing members 29 move from the position shown in FIG. 4a to the position in FIG. 4c. If a number wheel is displaced from its zero position, the respective clearing member 29 engages a lateral curved surface of the respective heart cam 30 and turns the same to the position of FIG. 4c so that the respective number wheel is turned to its zero position and thus cleared.

However, the number wheels of each set are connected by tens-transfer means which must be disconnected to permit the independent turning of each number wheel during the clearing operation by means of heart cams 30.

Figure 4A:
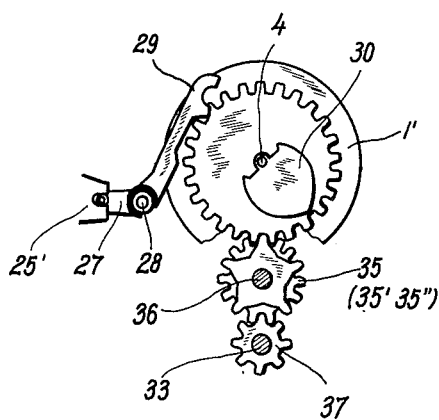
FIG. 4a is a fragmentary side view.
Figure 4B:
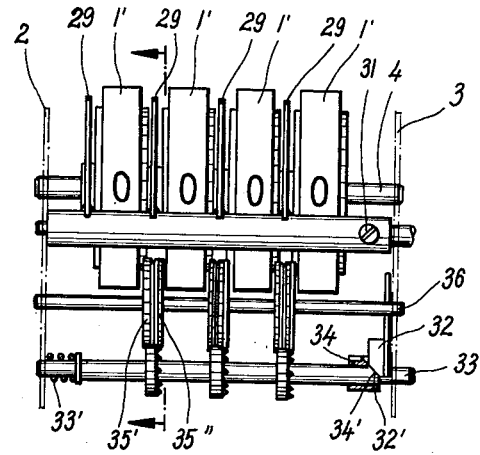
FIG. 4b is a fragmentary front view illustrating the heart cam clearing means according to the invention in one operational position.
Figure 4C:
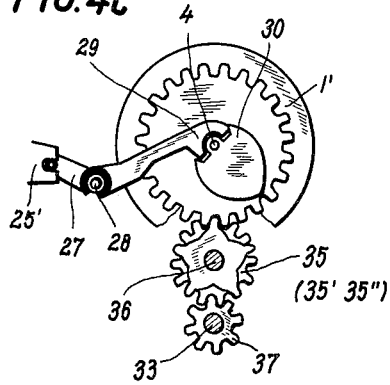
FIG. 4c is a fragmentary side view.
Figure 5:
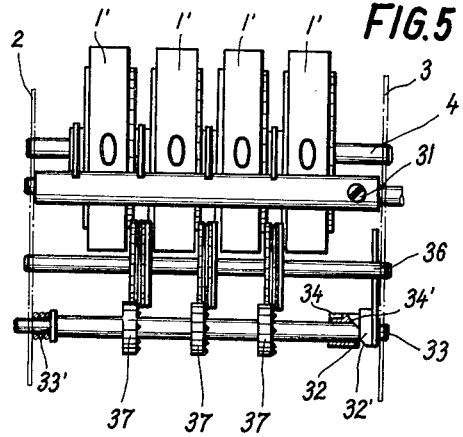
FIG. 5 is a fragmentary front view illustrating the heart cam clearing means in another operational position.

As best seen in FIGS. 4b and 5, a shaft 33 is mounted on support plates 2 and 3, and is loaded by spring 33' to move to the right as viewed in the drawing and to a position in which a bushing 34 having a slanted guide face 34' abuts a corresponding slanted guide face 32' on a wedge member 32 which is secured to control slide 24.

When control slide 24 is moved down by the action of cam track 22 on cam follower 19, the engagement of the slanted surfaces causes movement of shaft 33 to the left from the position of FIG. 4b to the position of FIG. 5.

As best seen in FIG. 2, control slide 24 has four arms 24' with wedge members 32 respectively cooperating with four shafts 33.

Figure 6:
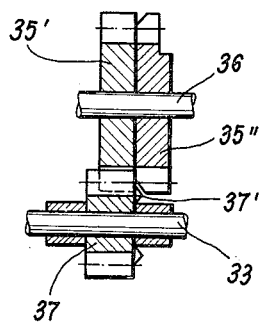
FIG. 6 is a fragmentary sectional view illustrating a detail of FIG. 5 on an enlarged scale.

Each shaft 33 carries a set of gears 37 which respectively mesh with tens-transfer gears 35, each of which comprises two gears 35' and 35". In the normal position shown in FIG. 4b, each gear 37 on shaft 33 cooperates with both gear parts 35', 35" and a tens-transfer operation is accomplished. When shaft 33 is shifted to the position of FIG. 5, each gear 37 meshes with gear part 35' only, as best shown in FIG. 6. Consequently, the gear transmission between adjacent number wheels 1' is interrupted, and each number wheel 1' can turn individually, since gear parts 35' and 35" may now turn at different speeds at which they are driven from gears secured to the respective number wheels 1'.

In order to facilitate the meshing engagement between gears 37 and gear parts 35" when shaft 33 shifted from the position of FIG. 5 back to the position of FIG. 4b, each tooth of gear 37 has a projection 37' of conical shape which facilitates the sliding of the gear teeth of gears 37 into the spaces between the gear teeth of gear part 35", as best seen in FIG. 6.

As explained above, during rotation of control cam means 7, slide 24 is downwardly shifted to move the tens-transfer means 37 to the inoperative position, while control slide 35 is downwardly shifted to cause operation of clearing members 29 which return through the heart cams 30 the number wheels 1' to the zero position. Control cam means 19 and 20 and gear 7 are driven during this clearing operation by drive member 5 turning in counter-clockwise direction under the action of spring 10. In order to tension spring 10, it is necessary to wind up drive member 5 which is accomplished by a device best seen in FIGS. 1, 7 and 8. Drive member 5 carries a cam follower roll 41 cooperating with a wind-up cam 42 which causes turning movement of drive member 5 in clockwise direction to tension spring 10. Cam 42 is freely turnable on a pivot 43 and carries a pawl 44 on a pin 45. Pawl 44 engages a ratchet wheel 46 for turning movement in clockwise direction. Ratchet wheel 46 is a portion of a drive wheel 47 provided with a gear crown meshing with a pinion 49 on a wind-up shaft 48. Wheel 46 has an annular recess 50 in which a dished spring 51 is disposed in a position axially abutting a friction disc 52 which engages cam 42. Cam 42 abuts in axial direction on a bushing 53 which is secured to shaft 43 by a spring ring 54.

Shaft 48 is either driven from the liquid operated meter 169, or is connected by a flexible shaft with motor 147 or pump 56. Under certain circumstances it may be necessary to wind up the clearing arrangement by a manual operation, which is accomplished by a coupling portion 55 on which a crank handle, not shown, may be placed. A flange 57 with a cutout 58 is located in a recess 59 of cam 42, and cooperates with a pawl 60 on cam 42 in such a manner that turning of coupling member 55 in clockwise direction will effect turning of cam 42, and thus winding up of drive member 5.

Cam 42 has a stop projection 61 cooperating with a projecting stop arm 62 of drive member 5 as long as drive member 5 is not in the position which it assumes when the clearing operation has just been completed. Stop 61 and stop arm 62 prevent an angular displacement of cam 42 out of the position shown in FIG. 7 during the clearing operation. Such displacement must be prevented since otherwise the clearing operation may not be completed in the event that cam follower roll 41 of drive member 5 abuts the periphery of cam 42 and thus prevents a turning of drive member 5 in counterclockwise direction to the desired terminal position.

Pawl 44 has a free arm 44′ which projects beyond the periphery of cam 42 as best seen in FIG. 7. Arm 44′ cooperates with a transverse projection 63 on drive member 5 so that pawl 44 is turned by projection 63 to a position releasing ratchet 46 when drive member 1 assumes the position shown in FIG. 1.

Referring now to FIGS. 9, 10 and 11, the number wheels and register means are driven from shaft 66 and 67 which are driven from meter 160. Coupling means 64, 65 are respectively provided on shaft 66, 67. Coupling parts 64′, 65′ are shiftable on shaft 66, 67 in axial direction, and are urged by spring 68, 69 into engagement with the other coupling parts 64″, 65″. Gears 69 and 70 are respectively connected to coupling parts 64″ and 65″. Coupling parts 60′ and 65′ are connected to shaft 66 and 67 for rotation therewith, but are shiftable in axial direction. A pair of shifting lever arms 71, 72 project from a U-shaped member 74 which is mounted for turning movement on a vertical shaft 73. An arm 75 projects from member 74, and have a slanted guide face 76 engaged by a corresponding slanted guide face 77 on control slide 74. When control slide 74 is moved downward by the control cam means 7, 22, shifting member 74, 72, 75 is turned in clockwise direction as viewed in FIG. 11 so that couplings 64, 65 are shifted to a disconnected position, preventing further drive of the registers from the meter 160.

A locking and releasing mechanism controlling the operations of drive member 5, is illustrated in FIGS. 12 to 15. The locking and release mechanism performs in accordance with the present invention the following functions:

(1) The drive member 5 is arrested in the position in which the clearing spring 10 is fully tensioned.

(2) The arrested drive member 5 can be released in a simple manner for starting the clearing operation.

(3) After completion of the clearing operation, the pump motor switch 146 is automatically actuated.

(4) Operation of switch 146 to start the motor before the completion of the clearing operation is prevented.

(5) The clearing operation cannot be disturbed or interrupted by intended or accidental acts of the operator.

(6) The start of the clearing operation, and the disconnection of the pump motor is accomplished by a single manually operated member, such as the dispenser valve of a pump column of a gas station.

Referring now to FIGS. 12 to 14, arm 13 of drive member 5 has locking teeth 14 cooperating with a locking projection 15′ of a first locking lever 15. Arm 13 also carries a roller 115 cooperating with the projecting arm 116′ of a second locking lever 116. Locking levers 15 and 116 are turnably mounted on a pivot pin 12′ secured to support plate 3, and are biassed to turn in clockwise direction. A spring 117 acts on blocking lever 116, and a spring 118 acts on locking lever 15. Spring 118 is secured to a fixed pin 119 and to a transverse projection 120 of locking lever 15. Transverse projection 120 crosses locking lever 116 so that the same is taken along during turning movement of locking lever 15 in counterclockwise direction. Each locking lever 15 and 116 has a downwardly extending projection which are exactly superimposed in the positions illustrated in FIGS. 12 and 13. In the operational position shown in FIG. 12, the end faces of projections 121 abut a fixed stop pin 119 on support plate 3, and in the operational position of FIG. 13, projections 121 abut a transverse shoulder 122 of a latch member 123 which is mounted on a pivot means 124 for turning movement and is biassed by a spring 125 into engagement with pin 119. Latch member 123 is located in the path of movement of a projection 126 of drive member 5, as best seen in FIG. 14.

An arm 15″, shown in FIG. 1 to form part of locking lever 15, is not shown in FIGS. 12 and 13 since this arm performs no function when the automatic wind-up arrangement of the embodiment of FIG. 1 is used. Arm 15″ is used in the manually wound up embodiment of FIG. 19, which will be described hereinafter, but a standard part may be used for both constructions.

Locking lever 15 has a shoulder 127 which registers with the upper edge of a rectangular cutout 128 in locking lever 116.

In the position of readiness of the locking and release mechanism, a pin 129 on a latch lever 130 is located in the cutout 128. Latch lever 130 is mounted on the arm 131 of an angular lever 132 which is secured to shaft 133 which was previously mentioned with reference to FIGS. 16 and 17. Shaft 133, and shaft 137 are mounted in a bearing bracket 135 secured to support plate 3. The second arm 134 of angular lever 132 holds one end of a spring 132′ which is connected to latch lever 130. Arm 134 also has a transverse projection 134′ crossing an actuating lever 136 which is secured to shaft 137 and controls motor switch 146. A coil spring 84 is wound about shaft 137 and biases actuating lever 136. A projecting portion 136′ on lever 136 cooperates with a shoulder 138′ of a latch 138 which is mounted on a pin 124 on support plate 3 for turning and shifting movement, pin 124 being located in a slot 139, as best seen in FIG. 15.

A spring 140 urges latch 138 downward, and also into abutting engagement with a stop 141. When shoulder 138′ of latch 138 engages projection 136′ of actuating lever 136, the same is held in a lower position in which switch 146 disconnects motor 147. Latch 138 assumes the higher position shown in FIG. 15 since the torsion spring 84 acting on actuating lever 136 in clockwise direction is stronger than spring 140 which pulls latch 138 downwardly. Consequently, projection 142 of latch 138 is located in the path of movement of projection 126′ of drive member 5 only when actuating lever 136 is locked by shoulder 138′ of latch 138.

Control slide 25 which renders the tens-transfer means inoperative, as explained with reference to FIG. 5, has an arm 143 which in the lower operative position of control slide 25 engages a shoulder 136″ of actuating lever 136 to hold lever 136 in the position of FIG. 13, even after projection 136′ was released by shoulder 138′ of latch 138 when the latter is turned to a releasing position by projection 126′ of drive member 5. In this manner, the lower position of actuating member 126 is maintained until the clearing operation is completed and control slide 25 returns to its upper inoperative position.

The clearing arrangement is operated in the following manner:

Drive member 5 is in the position shown in FIG. 7 after a clearing operation has been completed. Roller 41 of drive member 5 engages the lowest point of cam 42, and pawl 44 engages the teeth of ratchet 46. During a dispensing operation, shaft 48 is turned, for example by the meter shaft, and rotates through pinion 49 ratchet wheel 46 so that cam 42 is turned and acts through cam follower roller 41 to turn drive member 5 in clockwise direction to the position shown in FIG. 1. Cam 42 performs only a single revolution after which drive member 5 stops in a displaced angular position. After turning of cam 42 through about 350°, cam follower roll 41 is on the highest point of the cam, and projection 63 of drive member 5 engages the end 44′ of pawl 44 to release the same from the ratchet wheel 46. At the same time, locking lever 15 engages the first tooth of the locking teeth 14 on drive member 5 so that drive member 5 is locked. During the completion of the revolution of cam 42 through 10°, end portion 44′ passes over projection 63 so that the ratchet wheel 46 is disengaged by pawl 44. As best seen in FIG. 1, stop arm 62 of drive member 5 engages in this position stop 61 on cam 42 so that cam 42 cannot turn any farther. The friction coupling 51, 52, see FIG. 8, causes a slight turning movement on cam 42 in its normal direction of rotation, so that cam 42 cannot turn back.

It will be understood that shaft 48 turns during the entire liquid dispensing operation, and consequently turns wheel 46, 47. If shaft 48 is driven from the meter, it is turned since the meter is rotated by the dispensed liquid. If shaft 48 is connected through a flexible shaft with a pump motor, or with a pump, it is also continuously rotated.

In the event that the automatic wind-up device cannot be used, a crank handle, not shown, is attached to the coupling portion 55 on shaft 43, so that by turning of the crank handle, turning of cam 42 through pawl 60 engaging shoulder 58 is effected, and drive member 5 is turned until spring 10 is tensioned. Stop 61 cooperating with stop arm 62 will again limit the turning movement to 360°, so that the drive member 5 is stopped in the proper position.

During the tensioning of spring 10 by angular movement of drive member 5 in clockwise direction, pinion 8 is driven by gear segment 9 in counterclockwise direction. However, the control means 7 with cams 19 and 20 are not operated since pawls 16 cannot transfer a turning movement to ratchet wheel 8 in counterclockwise direction. Pawls 16 slide over the teeth of ratchet wheel 8 during the turning of drive member 5 in clockwise direction, and when drive member 5 arrives in its terminal position, pawls 16 snap into the ratchet wheel 8.

The winding up of spring 10 takes place during the dispensing and metering of the liquid. At the beginning of this operation, all parts are in the position illustrated in FIG. 1. The dispensing valve has been removed from its rest and releases angular lever 115 which turns to the position shown in broken lines in FIG. 17, as explained above. When the dispensing operation has been completed, the dispensing valve 153 is again placed in the position shown in solid lines in FIG. 17, and lever 150 is turned to the position shown in solid lines so that shaft 133 is turned through link means 148 and 149 to a position in which angular lever 132 assumes the position shown in FIG. 12. During this angular movement, projection 134′ acts on actuation lever 136 to turn the same with shaft 137 in counterclockwise direction until projection 136′ is locked by shoulder 138′ of latch 138, resulting in operation of switch 146 by which the motor is disconnected. Latch 130 on arm 131 of lever 132 moves into cutout 128 and abuts not only locking lever 116, but also locking lever 15 whose edge 127 is aligned with the upper edge of cutout 128. Lever 132 is thus locked, together with lever 136, and motor switch 146 remains in the "off" position so that motor 147 stops.

At the beginning of a new dispensing operation, the dispensing valve 153 is again removed from its rest so that spring 152 turns lever 150 about its pivot 151 in clockwise direction so that the locking and release mechanism assumes the position shown in FIG. 13. Shaft 133 is turned through links 148, 149 in clockwise direction so that latch 130 with its locking pin 129 acts on locking levers 15 and 116 to turn the same out of the locking position shown in FIG. 12, permitting spring 10 to turn drive member 5 in counterclockwise direction. Locking levers 15 and 116 turn in counterclockwise direction until stopped by the transverse projection 122 of latch 123 which engages the ends of projections 121 on locking lever 15 and locking lever 116.

Shortly before the end of the counterclockwise angular movement of drive member 5, projection 126 engages latch 123 in the position shown in FIG. 14, while projection 126′ engages the transverse projection 142 of latch 138, as best seen in FIG. 15 so that both latches 123 and 138 are turned in anti-clockwise direction about the pivot means 124 on which they are supported.

Such turning movement of latches 123 and 138 effects a release of projections 121 so that locking levers 15 and 116 are free to return to the position shown in FIG. 12.

Latch 138 turns to a position dis-engaging projection 136′, and actuating lever 136, while being pulled downward by spring 140. In the lower position of latch 138, projection 142 is no longer located in the path of movement of projection 126′ of drive member 5 so that the latch can return to its normal position ready for the next locking of actuating lever 136.

Since it is difficult to adjust the moment in which latch 138 releases lever 136 so precisely that only after a complete clearing operation, lever 136 is released for starting the motor, lever 136 is retained in the lower position by the arm 143 of control slide 25, and is released by the control slide only when the same has been again raised to its higher inoperative position.

The power of spring 10 turning drive member 5 in counterclockwise direction is used for the clearing of registers 1. When drive member 5 turns in counterclockwise direction, and gear teeth 9 turn control means 7, with cams 19 and 20 through pawl means 16 and ratchet 8′, cam followers 22, 23 with control slide 24 and 25 perform a single up and down motion during turning of member 7. Control slide 24 acting through wedges 32 shifts shafts 33 to the position shown in FIG. 5 so that the tens-transfer gears 35′, 35″ are disconnected permitting adjacent number wheels to individually turn. Slide 35 actuates the clearing members 29 which turn the number wheels through the heart cams 30 to the zero position. When control slide 25 moves back to its initial position under the action of spring 26, the clearing members 29 return to their initial positions so that all parts are ready for the next dispensing and metering operation.

Figure 19:
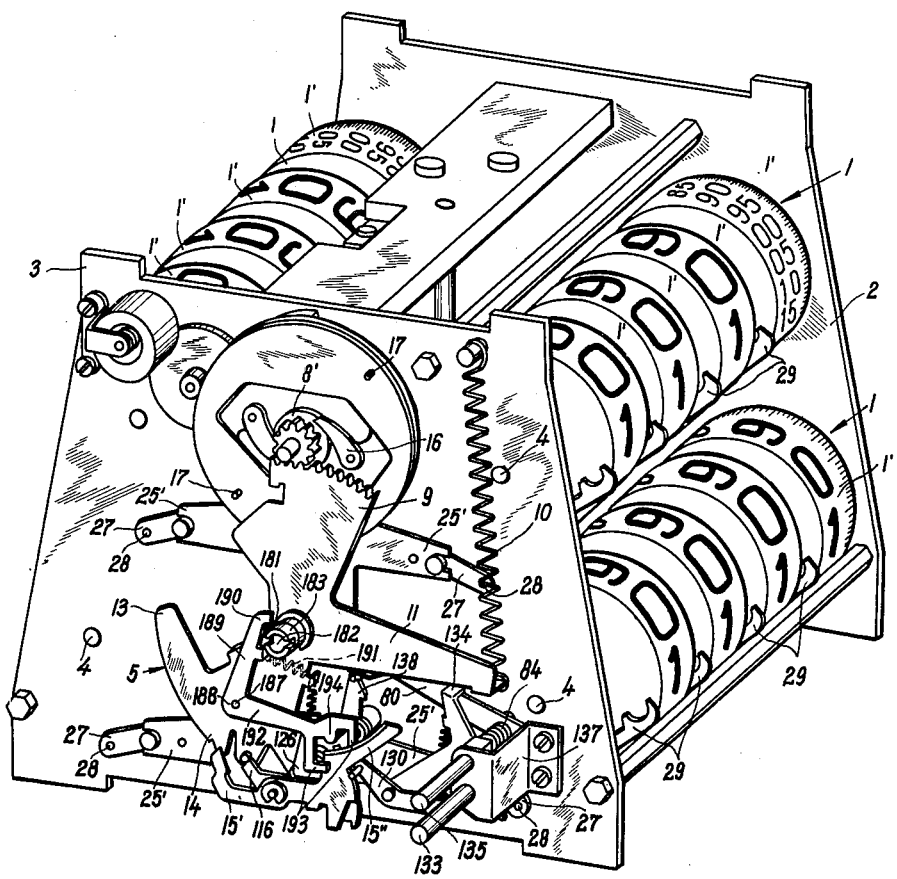
FIG. 19 is a perspective view illustrating a modified embodiment of the invention in which a clearing spring motor is wound up by a manual operation.
Figure 20:
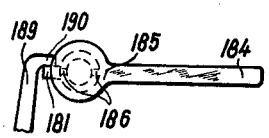
FIG. 20 is a side view of a handle for winding up the clearing arrangement of FIG. 19.

In the modified embodiment illustrated in FIGS. 19 and 20, the spring motor 5, 10 is not wound up by the power of the pump motor or meter, but by a manual operation. Therefore, cam 42 and the associated members are omitted in the embodiment of FIG. 19. Shaft 12 carries a coupling projection 181, and a coupling sleeve 183 provided with axial slots 182 into which projections 186 of a corresponding part 185 of a handle 184 fit. A pivot means 187 is secured to arm 13 of drive member 5, and turnably supports an angular lever 188 having an arm 189 with a projection 190 which is located in the path of movement of the coupling projection 181. A spring 191 connected to arm 198 of angular lever 188, biases lever 188 to turn in clockwise direction. The second arm 192 of lever 188 has a guide fork 193 with two prongs, one of which has a lug 194. The prongs of fork 193 slide along the arm 15″ of locking lever 15. The upper edge of arm 15″ cooperates with lug 194 and engages the same when locking lever 15 is turned out of its locking position shown in FIG. 19 in counterclockwise direction. As a result, lever 188 is also turned in counterclockwise direction so that its projection 190 is moved out of the path of movement of coupling projection 181.

After the clearing operation has been started by turning latch 130, projection 190 of arm 189 is out of engagement with the coupling projection 181, so that drive member 5 cannot be stopped by lever 184 during the clearing operation which otherwise may accidentally or mischievously happen. Only when locking lever 15 is again in the position shown in FIG. 19, can a manual force be exerted on the drive member 5 in clockwise direction. If lever 184 is then turned a certain angle in clockwise direction, arm 189 turns drive member 5 through coupling projection 181.

The construction of FIG. 19 in which the spring motor for clearing the registers can be manually wound up, permits the use of the embodiment of FIG. 19 under all possible operational conditions. The clearing operation, and the functioning of the locking and releasing mechanism are the same as described with reference to FIGS. 1 to 18.

It will be understood that each of the elements described above, or two or more together, may also find a useful application in other types of clearing arrangements differing from the types described above.

While the invention has been illustrated and described as embodied in a clearing arrangement for the registers of a liquid dispensing pump, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A clearing arrangement for a liquid dispensing and metering apparatus and comprising, in combination, a pump, a motor for driving said pump to dispense liquid; a meter for measuring the amount of dispensed liquid, a plurality of ordinal sets of number wheels driven from said meter; tens-transfer means connecting number wheels of adjacent orders, said tens-transfer means having an operative tens-transfer position and an inoperative position in which the number wheels of adjacent orders are turnable independently of each other; clearing means including a heart cam connected to each number wheel for rotation therewith, and a clearing member cooperating with each heart cam and having an inoperative position and an operative position engaging the respective heart cam for turning the same to a zero position in which the respective number wheel is cleared; control means for moving said tens-transfer means to said inoperative position and said clearing members to said operative positions; spring-loaded drive means adapted to be wound up from a relieved position to a tensioned position, and operatively connected to said control means to actuate the same when released and returning to said relieved position; a dispensing valve manually movable between an inoperative position suspended on said apparatus and an operative dispensing position; locking means for locking said drive means in said tensioned position and controlled by said dispensing valve to release said drive means when said dispensing valve is moved from said inoperative position to said operative position; and means connecting said drive means with one of said elements so that said drive means is wound up during the dispensing operation.

2. A clearing arrangement for a liquid dispensing and metering apparatus comprising, in combination, a meter for the dispensed liquid; a plurality of ordinal sets of number wheels driven by said meter; tens-transfer means connecting number wheels of adjacent orders, said tens-transfer means having an operative tens-transfer position and an inoperative position in which the number wheels of adjacent orders are turnable independently of each other; clearing means including a heart cam connected to each number wheel for rotation therewith, and a clearing member cooperating with each heart cam and having an inoperative position and an operative position engaging the respective heart cam for turning the same to a zero position in which the respective number wheel is cleared; control means connected with said tens-transfer means for moving the same to said inoperative positions, and to said clearing members for moving the same to said operative positions; spring-loaded drive means connected to said meter for being wound up from a relieved position to a tensioned position, and operatively connected to said control means to turn the same when released and returning to said relieved position; a dispensing valve manually movable between an inoperative position suspended on said apparatus and an operative dispensing position; locking means for locking said drive means in said tensioned position and controlled by said dispensing valve to release said drive means when said dispensing valve is moved from said inoperative position to said operative position; and means connecting said drive means with said meter so that said drive means is wound up during the dispensing operation.

3. A clearing arrangement for a liquid dispensing and metering apparatus comprising, in combination, a meter for the dispensed liquid; a plurality of ordinal sets of number wheels driven by said meter; tens-transfer means connecting number wheels of adjacent orders, said tens-transfer means having an operative tens-transfer position and an inoperative position in which the number wheels of adjacent orders are turnable independently of each other; clearing means including a heart cam connected to each number wheel for rotation therewith, and a clearing member cooperating with each heart cam and having an inoperative position and an operative position engaging the respective heart cam for turning the same to a zero position in which the respective number wheel is cleared; control means including turnable control cam means having a first cam track and a second cam track, a first cam follower means cooperating with said first cam track and operatively connected with said tens-transfer means for moving the same to said inoperative position, and a second cam follower means cooperating with said second cam track and operatively connected with said clearing members for moving the same to said operative positions; and spring-loaded drive means connected to said meter for being wound up from a relieved position to a tensioned position, and operatively connected to said control cam means to turn the same when released and returning to said relieved position; a dispensing valve manually movable between an inoperative position suspended on said apparatus and an operative dispensing position; locking means for locking said drive means in said tensioned position and controlled by said dispensing valve to release said drive means when said dispensing valve is moved from said inoperative position to said operative position; and means connecting said drive means with said meter so that said drive means is wound up during the dispensing operation.

4. A clearing arrangement for a liquid dispensing and metering apparatus and comprising, in combination, a pump, a motor for driving said pump to disepnse liquid; a meter for measuring the amount of dispensed liquid; a plurality of ordinal sets of number wheels driven from said meter; tens-transfer means connecting number wheels of adjacent orders, said tens-transfer means having an operative tens-transfer position and an inoperative position in which the number wheels of adjacent orders are turnable independently of each other; clearing means including a heart cam connected to each number wheel for rotation therewith, and a clearing member cooperating with each heart cam and having an inoperative position and an operative position engaging the respective heart cam for turning the same to a zero position in which the respective number wheel is cleared; control means including turnable control cam means having a first cam track and a second cam track, a first cam follower means cooperating with said first cam track and operatively connected with said tens-transfer means for moving the same to said inoperative position, and a second cam follower means cooperating with said second cam track and operatively connected with said clearing members for moving the same to said operative positions; spring-loaded drive means adapted to be wound up from a relieved position to a tensioned position, and operatively connected to said control cam means to turn the same when released and returning to said relieved position; and means for connecting said drive means with one of said elements so that said drive means is wound up during a dispensing operation.

5. A clearing arrangement for a liquid dispensing and metering apparatus and comprising, in combination, a meter for measuring the amount of dispensed liquid; a plurality of ordinal sets of number wheels; coupling means for coupling said sets of number wheels with said meter so that said number wheels are driven from said meter; tens-transfer means connecting number wheels of adjacent orders, said tens-transfer means having an operative tens-transfer position and an inoperative position in which the number wheels of adjacent orders are turnable independently of each other; clearing means including a heart cam connected to each number wheel for rotation therewith, and a clearing member cooperating with each heart cam and having an inoperative position and an operative position engaging the respective heart cam for turning the same to a zero position in which the respective number wheel is cleared; control means for moving said tens-transfer means to said inoperative position and said clearing members to said operative positions, said control means being operatively connected to said coupling means to disconnect the same when said tens-transfer means are moved to said inoperative position so that said number wheels are not driven while being returned to a zero position; spring-loaded drive means adapted to be wound up from a relieved position to a tensioned position, and operatively connected to said control means to actuate the same when released and returning to said relieved position; a dispensing valve manually movable between an inoperative position suspended on said apparatus and an operative dispensing position; locking means for locking said drive means in said tensioned position and controlled by said dispensing valve to release said drive means when said dispensing valve is moved from said inoperative position to said operative position; and means connecting said drive means with said meter so that said drive means is wound up during the dispensing operation.

6. A clearing arrangement for a liquid dispensing and metering apparatus and comprising, in combination, a meter for measuring the amount of dispensed liquid; a plurality of ordinal sets of number wheels; coupling means for coupling said sets of number wheels with said meter so that said number wheels are driven from said meter; tens-transfer means connecting number wheels of adjacent orders, said tens-transfer means having an operative tens-transfer position and an inoperative position in which the number wheels of adjacent orders are turnable independently of each other; clearing means including a heart cam connected to each number wheel for rotation therewith, and a clearing member cooperating with each heart cam and having an inoperative position and an operative position engaging the respective heart cam for turning the same to a zero position in which the respective number wheel is cleared; control means including turnable cam means having a first cam track and a second cam track, first and second cam followers cooperating with said first and second cam tracks, and first and second control slides operated by said first and second cam followers, said first control slide being operatively connected with said tens-transfer means for moving the same to said inoperative position and to said coupling means to disconnect the same when moving said tens-transfer means, and said second control slide being operatively connected with said clearing members to move the same to said operative positions so that said number wheels are not driven while being returned to the zero position; spring-loaded drive means adapted to be wound up from a relieved position to a tensioned position, and operatively connected to said control means to actuate the same when released and returning to said relieved position; a dispensing valve manually movable between an inoperative position suspended on said apparatus and an operative dispensing position; locking means for locking said drive means in said tensioned position and controlled by said dispensing valve to release said drive means when said dispensing valve is moved from said inoperative position to said operative position; and means connecting said drive means with said meter so that said drive means is wound up during the dispensing operation.

7. A clearing arrangement for a liquid dispensing and metering apparatus and comprising, in combination, a meter for measuring the amount of dispensed liquid; a plurality of ordinal sets of number wheels driven from said meter; tens-transfer means connecting number wheels of adjacent orders, said tens-transfer means having an operative tens-transfer position and an inoperative position in which the number wheels of adjacent orders are turnable independently of each other; clearing means including a heart cam connected to each number wheel for rotation therewith, and a clearing member cooperating with each heart cam and having an inoperative position and an operative position engaging the respective heart cam for turning the same to a zero position in which the respective number wheel is cleared; drive means including a rotary drive member and a spring secured to said drive member and biassing the same to turn in one direction from a wound-up position to a relieved position; a rotary control cam means having first and second cam tracks; one-way coupling means for connecting said rotary drive member with said control cam means; and first and second control slides having cam followers cooperating with said first and second cam tracks, said first control slide being operatively connected with said tens-transfer means for moving the same to said inoperative position, and said second control slide being operatively connected with said clearing members to move the same to said operative positions whereby said number wheels are cleared when said drive member turns in said one direction; a dispensing valve manually movable between an inoperative position suspended on said apparatus and an operative dispensing position; locking means for locking said drive means in said tensioned position and controlled by said dispensing valve to release said drive means when said dispensing valve is moved from said inoperative position to said operative position; and means connecting said drive means with said meter so that said drive means is wound up during the dispensing operation.

8. A clearing arrangement as set forth in claim 7 wherein said rotary control cam means has said first and second cam tracks on a lateral face, said first cam track being a groove, and said second cam track being radially spaced from and located outwardly of said groove.

9. A clearing arrangement as set forth in claim 7 and including a rotary fly wheel connected to said control cam means for rotation therewith.

10. A clearing arrangement as set forth in claim 7 wherein said drive member has a plurality of arms, one of said arms having a gear segment, said one-way coupling means having a gear meshing with said gear segment, said drive member having another arm with a locking gear, and a locking lever cooperating with said locking gear and adapted to be controlled by said dispensing and metering apparatus.

11. A clearing arrangement as set forth in claim 7 wherein said wind-up means includes a rotary cam, and said drive member having a cam follower engaged by said cam so that rotation of said cam causes winding up of said spring and drive member.

12. A clearing arrangement as set forth in claim 11 and including a single revolution clutch for driving said cam and adapted to be connected to said meter so that said drive member and spring are wound up during a dispensing operation.

13. A clearing arrangement as set forth in claim 12 wherein said drive member has a projection for disengaging said single revolution clutch at the end of the turning movement of said drive member in said one direction.

14. A clearing arrangement as set forth in claim 13 and including a drive shaft driven from said meter, and a friction clutch connecting said drive shaft with said single revolution clutch.

15. A clearing arrangement as set forth in claim 7 wherein said drive member has a gear segment, said one-way coupling means having a gear meshing with said gear segment, and said rotary control cam means having stop means for engaging said drive member at the end of its turning movement in said one direction for blocking the same when a clearing operation has been completed.

16. A clearing arrangement for a liquid dispensing and metering apparatus and comprising, in combination, a pump, a motor for driving said pump to dispense liquid; a meter for measuring the amount of dispensed liquid; a plurality of ordinal sets of number wheels driven from said meter; tens-transfer means connecting number wheels of adjacent orders, said tens-transfer means having an operative tens-transfer position and an inoperative position in which the number wheels of adjacent orders are turnable independently of each other; clearing means including a heart cam connected to each number wheel for rotation therewith, and a clearing member cooperating with each heart cam and having an inoperative position and an operative position engaging the respective heart cam for turning the same to a zero position in which the respective number wheel is cleared; drive means including a rotary drive member and a spring secured to said drive member and biassing the same to turn in one direction from a wound-up position to a relieved position; a locking and releasing mechanism including locking lever means for locking and releasing said drive member, said mechanism including an actuating lever; switch means connected to said motor for starting and disconnecting the same, and being operated by said actuating lever; a rotary control cam means having first and second cam tracks; one-way coupling means for connecting said rotary drive member with said control cam means; first and second control slides having cam followers cooperating with said first and second cam tracks, said first control slide being operatively connected with said tens-transfer means for moving the same to said inoperative position, and said second control slide being operatively connected with said celaring members to move the same to said operative positions whereby said number wheels are cleared when said drive member turns in said one direction; a dispensing valve manually movable between an inoperative position suspended on said apparatus and an operative dispensing position said valve controlling said actuating lever to start and stop said motor, and controlling said locking lever means for releasing said drive means when said dispensing valve is moved from said inoperative position to said operative position; and means connecting said drive means with said meter so that said drive means is wound up during the dispensing operation.

17. A clearing arrangement as set forth in claim 16, said manually operated dispensing valve has a position of rest supported on said dispensing and metering apparatus and an operative dispensing position; a spring-loaded feeler lever adapted to be displaced by said dispensing valve in said position of rest and in said dispensing position, said locking and releasing mechanism including a lever operatively connected with said feeler lever and controlling said actuating lever and said locking lever means.

18. A clearing arrangement as set forth in claim 17 wherein said second control slide has an arm cooperating with said actuating lever to arrest the same during the clearing operation.

19. A clearing arrangement for a liquid dispensing and metering apparatus comprising, in combination, a meter for the dispensed liquid; register means driven by said meter; heart clearing means for clearing said register means; a biasing means having a tensioned position and a relieved position and operatively connected with said clearing means for actuating the same to perform a clearing operation when said biasing means is released and returns to the relieved position; a dispensing valve manually operable between an inoperative position suspended on said apparatus, and an operative dispensing position; locking means for locking said biasing means in said tensioned position and controlled by said dispensing valve to release said biasing means when said dispensing valve is moved from said operative position to said inoperative position; and means connecting said biasing means with said meter so that said biasing means is tensioned during the continued dispensing operation.

20. A clearing arrangement for a liquid dispensing apparatus, comprising, in combination, a pump element, a motor element driving said pump element to dispense liquid; a meter element for measuring the amount of dispensed liquid; register means driven by said meter element; heart clearing means for clearing said register means; a spring loaded drive means having a tensioned position and a relieved position and operatively connected with said clearing means for actuating the same to perform a clearing operation when said drive means is released and returns to the relieved position; a dispensing valve manually operable between an inoperative position suspended on said apparatus, and an operative dispensing position; locking means for locking said drive means in said tensioned position and controlled by said dispensing valve to release said drive means when said dispensing valve is moved from said operative position to said inoperative position; and means connecting said drive means with one of said elements so that said drive means is wound-up during the dispensing operation and including a friction coupling means.

References Cited by the Examiner

UNITED STATES PATENTS

| 1,955,904 | 4/34 | Carroll | 235—144 |
| 2,109,353 | 2/38 | Hazard | 235—144 |
| 2,121,396 | 6/38 | Dayton | 222—33 |
| 2,229,370 | 1/41 | Carroll | 235—144 |
| 3,054,531 | 9/62 | Carriol | 222—33 |
| 3,072,292 | 1/63 | Haupt et al. | 222—33 |
| 3,122,315 | 2/64 | Krebsdzio. | |

LOUIS J. DEMBO, *Primary Examiner.*